United States Patent [19]

Burgess

[11] Patent Number: 4,661,252

[45] Date of Patent: Apr. 28, 1987

[54] ROTARY SCREEN

[75] Inventor: George Burgess, Auckland, New Zealand

[73] Assignee: Contra-Shear Holdings Limited, New Zealand

[21] Appl. No.: 792,184

[22] Filed: Oct. 28, 1985

Related U.S. Application Data

[63] Continuation of Ser. No. 648,150, Sep. 7, 1984, abandoned.

[30] Foreign Application Priority Data

Sep. 8, 1983 [NZ] New Zealand ............ 205530

[51] Int. Cl.$^4$ ............................................. B01D 33/06
[52] U.S. Cl. ................. 210/402; 210/497.1; 210/499
[58] Field of Search ............ 210/359, 400, 402, 404, 210/497.01, 497.1, 499

[56] References Cited

U.S. PATENT DOCUMENTS

| | | | |
|---|---|---|---|
| 3,275,150 | 9/1966 | Tait | 210/404 X |
| 3,468,423 | 9/1969 | Le Pechon | 210/402 X |
| 3,584,685 | 6/1971 | Boyd | 210/497.1 X |
| 3,630,379 | 8/1970 | Sharples | 210/497.1 X |
| 3,876,548 | 4/1975 | Welles | 210/402 X |
| 4,038,187 | 7/1977 | Saffron | 210/499 X |

Primary Examiner—Charles Hart
Attorney, Agent, or Firm—Stevens, Davis, Miller & Mosher

[57] ABSTRACT

The invention relates to a semi-submergeable rotary screen for separating liquids and solids, in international class B01D 33/38. A substantially horizontal rotary screen comprises a drum formed of a plurality of spaced-apart circumferential wedge-wires and longitudinal supporting members, the supporting members being spaced longitudinally around the circumference of the drum separated by a distance of not less than 75 mm between adjacent supporting members. The circumferential wires are novel on a submerged screen and do not become blocked by fibres and neither will the longitudinal supporting members lead to blockages if sufficiently spaced. The supporting members may be fixed to the base sides of the wedge wires on the inside of the screen drum and preferably have a thickness measured radially of the drum of not less than 15 mm. Usual applications are for industrial waste recovery or separation.

9 Claims, 4 Drawing Figures

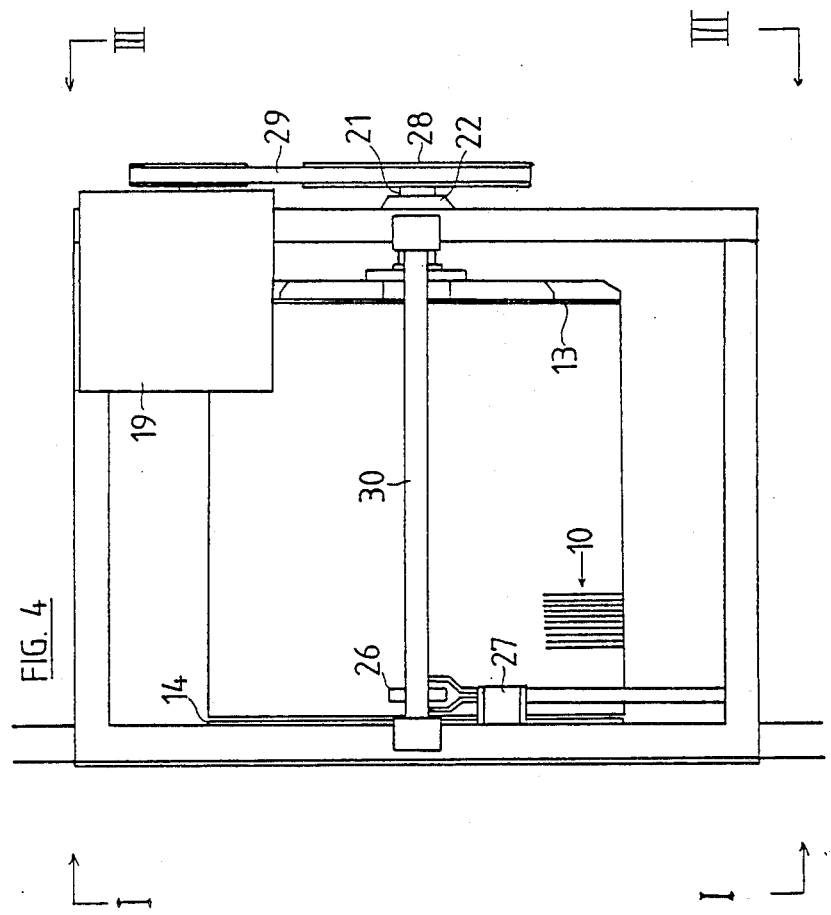

ROTARY SCREEN

This application is a continuation of application Ser. No. 648,150, filed Sept. 7, 1984 and now abandoned.

BACKGROUND OF THE INVENTION

This invention relates to rotary screens which are used for separating liquids from solids, for the purification of liquids or the recovery of solids from slurries.

Such screens are typically used in industrial processes, for example for the removal of waste products from effluents before discharging the effluents into drainage systems and for recovery of solids such as wood pulp from industrial slurries, and also in sanitary engineering installations, such as sewage filtration plants.

The rotary screens are in the form of drums having perforated circumferential walls for the passage of liquid through them, and mounted for rotation about axes which are substantially horizontal. It is well known to construct such rotary screens for "dry" operation, that is operation in which a slurry to be screened is fed into the inside of the screen by feeding means and the liquid from the slurry is collected from the outside of the screen, the screen itself not being immersed in the slurry. However, in many circumstances it may be preferable to provide a rotary screen which is capable of operating partially immersed in the slurry being screened.

Attempts have been made in the past to design a rotary screen which is suitable for such operation, and reference is made to U.S. Pat. No. 2,664,204 of A. T. Hurter and U.S. Pat. No. 3,979,289 of M. J. Bykowski and L. Ewing, which illustrate such screens. The screens shown in the patent specifications referred to are provided with screening walls formed of a perforated sheet material, but more recent design has favoured the use of spaced-apart wires of wedge-shaped cross-section, the wires generally extending longitudinally of the drum and being interlinked by supporting hoops extending circumferentially of the drum. Such construction is shown, for example, in British patent specification No. 2,076,307 of Alchaldean International Pty Limited.

In most applications of a rotary screen, the solids to be separated from liquids by the screen consist at least partially of fibres. When such fibres are screened by a rotating screen, they tend to wrap around solid portions of the screen wall which are moving relative to the slurry. Such fibres can accumulate to the extent that they block the apertures in the screen and prevent effective filtration. This problem is particularly acute when the screeen is partially immersed in the slurry so that the slurry is not caused to flow relative to the screen. The efficiency of known screens in which the screen wall is formed by perforated sheet material or of wedge wires which extend longitudinally of the screen is very poor when the screens are operated partially immersed in the slurry.

The above-mentioned patent specifications show conventional kinds of mounting and driving means for rotary screens, in which the screen is at least mounted, and sometimes driven by, means which are disposed partially or wholly below the lowest point of the rotation axis of the screen. Where the screen is to be operated partially immersed in the slurry being screened, such mounting and driving means must be either protected from the slurry or designed so that they are able to operate in the slurry. These design requirements substantially increase the costs of designing screens and manufacturing screens. The preferred embodiment described in this specification will reduce this problem by providing alaternative driving and supporting means for a rotary screen.

BRIEF SUMMARY OF THE INVENTION

The object of this invention is to provide improvements to rotary screens which will reduce the problem of blockage of screens by fibrous material.

The present invention consists in a rotary screen of the kind comprising a drum which is mounted for rotation about a substantially horizontal axis and is at least partially formed by a plurality of spaced-apart wires of wedge-shaped cross-section and a plurality of supporting members traversing and interlinking the wires; characterised in that:

[a] the wires extend circumferentially around the drum,
[b] the base of the wedge-shaped cross-section of each wire faces inwardly of the drum, and
[c] the supporting members are spaced apart around the circumference of the drum by a distance of not less than 75 mm between each pair of adjacent supporting members.

To enhance achievement of the object of the invention, preferably the thickness of each said supporting member, measured radially of the drum, is not less than 15 mm; the space between each pair of adjacent wires is not greater than the width of the said base of each such wire; and the ratio of the thickness of each such wire measured radially of the drum to the width of the said base of each such wire is not less than 2:1.

To reduce the disadvantages arising from conventional supporting and driving means, the drum may be at least partially supported by a bearing at a point higher than the lowest point of the axis of rotation of the screen, the bearing preferably being a wheel in contact with an inner surface of the drum; the drum may be at least partially supported by an axial bearing mounted externally of the drum at one end of the drum; and the axial bearing may rotatably support a member of the drum which is connected to a motor by transmission means for rotation of the drum by the motor, the said end of the drum being provided with a barrier preventing the flow of liquid therethrough.

BRIEF DESCRIPTION OF THE DRAWINGS

One embodiment of the invention is described below, by way of example only, with reference to the accompanying drawings, in which:

FIG. 4 is a plan view from above of the screen in the direction IV—IV of FIG. 1.

The screen is fundamentally a rotatable drum built up of a plurality of parallel wedge-wires extending circumferentially around the dru, and a plurality of bracing or supporting members extending longitudinally of the drum. For clarity, the individual wedge wires are not shown on the drawings, save for the indication at reference 10 in FIG. 4. In this embodiment, both the diameter and the axial length of the drum are approximately 1.5 m and the drum is intended for screening solids from sewage. It will be readily appreciated by a person skilled in the art that the size and spacing of the wedge wires will depend on the nature of the material to be screened. In this application, the wedge-wires have a base width of 4.8 mm, a height from base to apex of the wedge of approximately 10 mm, and are spaced apart by 2.5 mm.

Figure 1:
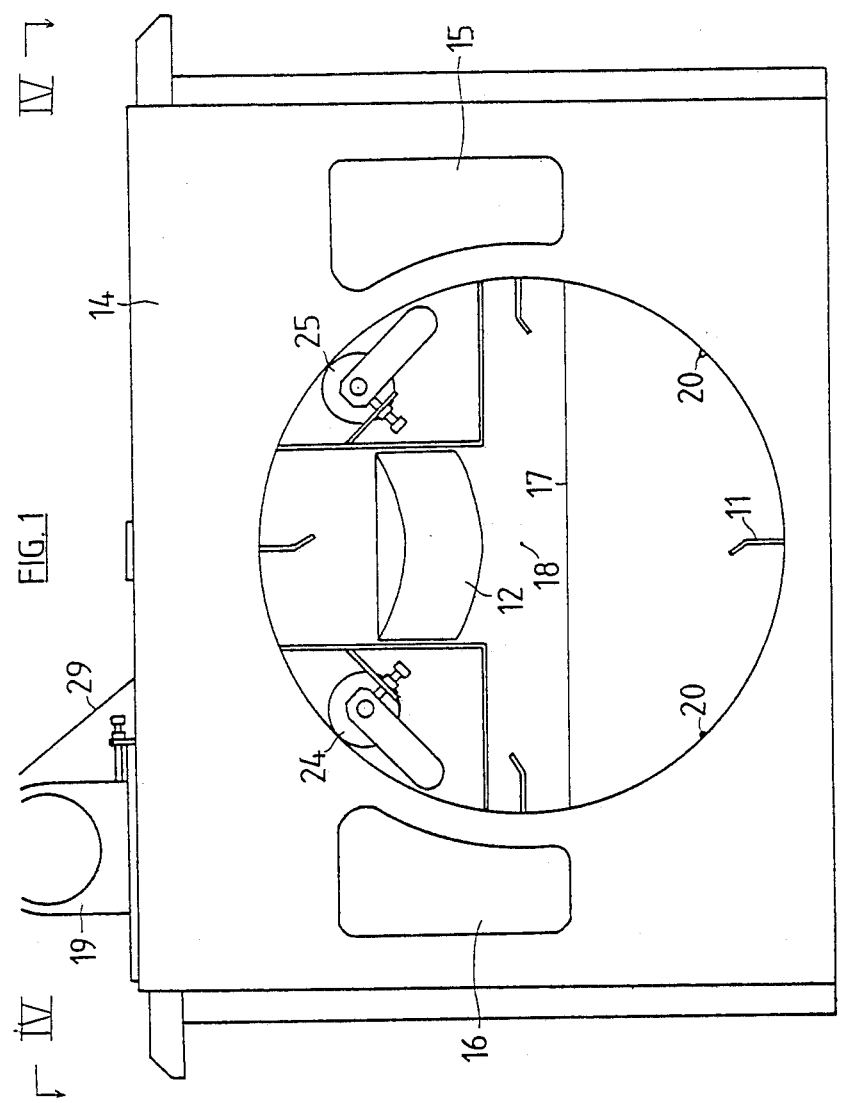
FIG. 1 is an end elevation of a rotary screen according to the invention, viewed from its inlet end in the direction I—I of FIG. 4.
Figure 2:
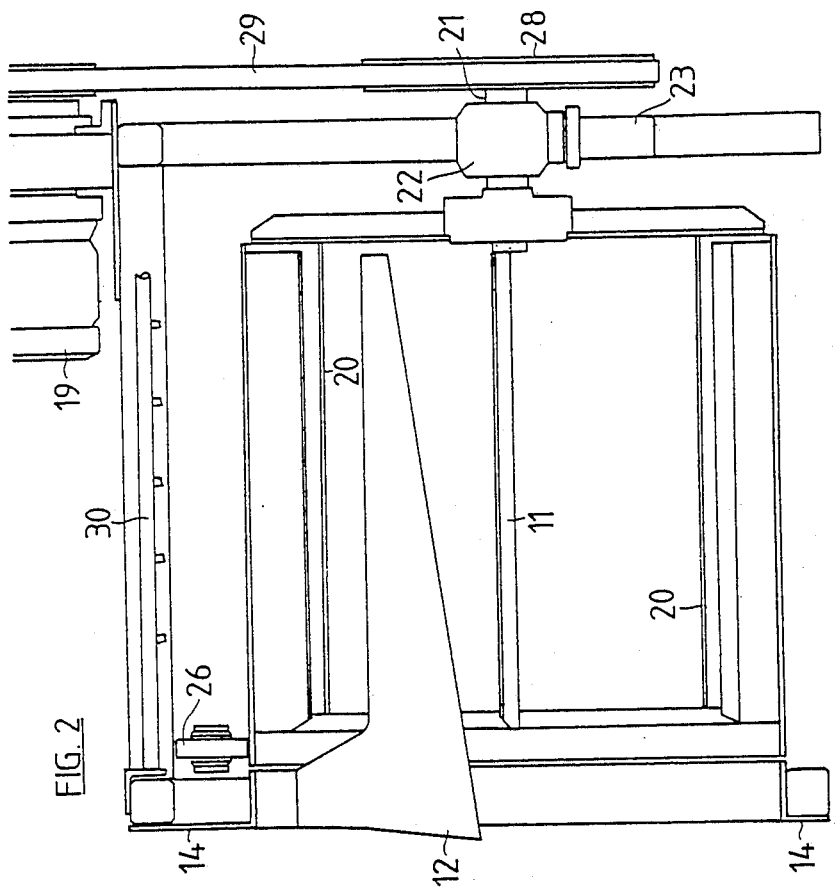
FIG. 2 is a vertical, axial section through the screen.

The drum is provided with substantially conventional lifting staves, one of which is indicated at 11 [FIGS. 1 and 2], four of the staves being disposed at equal intervals around the circumference of the drum and extending radially inwardly of the drum for a distance of 100 mm in accordance with known practice. The drum is further provided with a collection trough 12 [FIGS. 1 and 2] which is disposed beneath the highest point of the drum to collect solids falling from the lifting staves and facilitate removal of them by such means as is desired according to the application of the drum.

Figure 3:
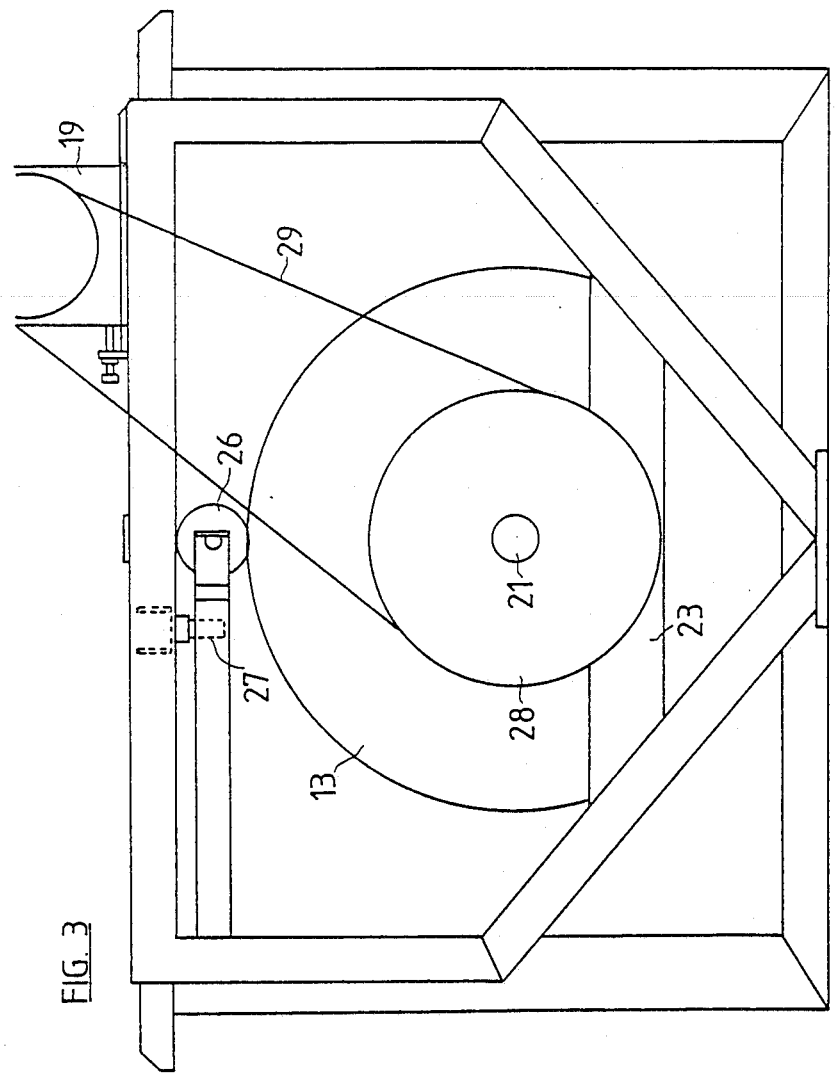
FIG. 3 is an end elevation of the screen, viewed from the end opposite to the inlet end in the direction III—III of FIG. 4.

The drum is open at one end, as viewed in FIG. 1, and completely closed by an end plate 13 at the opposite end as viewed in FIG. 3. The inlet end of the drum is surrounded by a wall 14 which may be sealed to the drum by a conventional neoprene seal to prevent the slurry being screened from flowing past the outside of the screen. The wall includes apertures 15,16 which provide spillways limiting the maximum level 17 of the slurry in the drum to a height below the axis 18 of the rotation of the drum. Thus, the screen assembly may be mounted at an end of a channel conveying the slurry to be screened so that the slurry permanently partially fills the drum and is screened by the drum.

To produce a screening action, the drum is rotatable about a horizontal axis 18 by a motor 19. Because the wedge wires extend circumferentially around the drum and not longitudinally of the drum, they do not provide solid faces moving through the slurry about which fibrous materials in the slurry will wrap. It has been found, in trials, that the slurry tends to be lifted to some extent by the smooth, inner faces of the wedge wires so that the slurry continuously flows along part of the length of the wedge wires as they rise from the slurry, thus improving the contact between the slurry and the wedge wires and improving the efficiency of the screen.

The wedge wires are supported partially by the lifting staves 11 which are welded across the inner faces of the wedge wires and, additionally, by longitudinal supporting bars, for example 20 [FIGS. 1 and 2], one of which is spaced half way between each pair of lifting staves. The spacing between adjacent lifting staves and supporting bars is thus approximately 590 mm. It has been found that such spacing should be not less than 75 mm, to avoid blockage of the screen by the wrapping of fibres around the longitudinal bodies which move through the slurry as the screen rotates. Where bodies extending longitudinally of the screen are more closely spaced, as for example, when longitudinal wedge-wires are used, it has been found that the screen will quickly block and the screening efficiency is very poor. To further reduce wrapping, the longitudinal members, that is the lifting staves and the supporting bars, should be not less than 15 mm thick measured radially of the drum. The lifting staves are, necessarily, of much greater depth measured radially of the drum, and the supporting bars 20 should also be of at least 15 mm thickness. Such spacing and thickness greatly discourages wrapping of fibres commonly found in sewage and industrial slurries. It has been found possible to mount supporting bars according to this invention on the inside of the drum, as shown in FIG. 1, where they can conveniently be welded across the base faces of the wedge wires.

Because of the efficiency of the screen resulting from both the resistance to blockage by wrapping of fibres and also the screening efficiency gained by the flowing of the slurry along the wedge wires as the screen rotates, it has been found possible to reduce the speed of the screen below the speeds which have been used in prior art screens. In this application, the motor and transmission means of the screen are preferably selected to produce a drum wall speed of 25 cm/sec. or, in this case, a rotation speed of approximately 3.2 r.p.m. This greatly simplifies the design of the seal between the drum and the front wall 14, allowing the use of conventional seals suitable for low relative speeds.

The performance and ease of installation of the screen is also enhanced by the mounting of the screen in such a way that no internal, axial shaft is required. The screen is supported partly by an axial shaft 21 extending outwardly of the screen from the closed end 13 and supported by a bearing 22 mounted in a frame member 23, and a pair of wheels 24,25 which are adjustably mounted on supporting framework [not shown] and which support the inlet end of the screen from the inside. If desired, the screen would be wholly supported by wheels such as 24,25 so that the supporting means of the screen are entirely above the rotation axis of the screen and the level of the slurry inside the screen. Associated with the wheels 24,25 is an idler wheel 26 which is biassed by spring biassing means 27 downwardly onto the outside of the screen to prevent the screen from rising off the wheels 24,25.

In this embodiment, the shaft 21 is used also to drive the screen. The shaft 21 mounts a pulley 28 which is arranged to be driven by the motor 19 by any suitable transmission means, such as a chain or a toothed belt 29. The pulley 28 and the transmission means may be enclosed in a casing, if desired, for further protection against entry of the slurry being screened or other liquids. The drum is thus rotated about an axis which is substantially horizontal. The phrase substantially horizontal is intended to include inclinations of axis other than strictly horizontal.

This method of mounting and driving the screen greatly simplifies the problem of immersing the screen in the slurry, eliminating the need to protect the mounting and driving means from the slurry.

The screen is also provided with overhead washing sprays 30 of a conventional kind.

What I claim is:

1. A rotary screen of the kind for in-line semi-submergible screening comprising a drum which is mounted for rotation about a substantially horizontal axis and is at least partially formed by a plurality of spaced-apart wires of wedge-shaped cross-section and a plurality of supporting members traversing and interlinking the wires at least some of which are lifting staves spaced apart around the drum interior characterized in that:
    (a) the wires extend circumferentially around the drum,
    (b) the base of the wedge-shaped cross-section of each wire faces inwardly of the drum, (c) the supporting members are spaced apart around the circumference of the drum by a distance of not less than 75 mm between each pair of adjacent supporting members, (d) a solids removal means positioned within the drum to collect solids falling from said lifting staves, and (e) an overhead spray means directed so as to assist the removal of solids from the lifting staves as they pass above the solids removal means so that the solids falling from the lifting staves fall onto said solids removal means.

2. A rotary screen according to claim 1, wherein the space between each pair of adjacent wires is not greater than the width of the said base of each such wire.

3. A rotary screen according to claim 1, wherein the ratio of the depth of each wire measured radially of the drum to the width of the said base of the wire is not less than 2:1.

4. A rotary screen of the kind for in-line semi-submergible screening comprising a drum which is mounted for rotation about a substantially horizontal axis and is at least partially formed by a plurality of spaced-apart wires of wedge-shaped cross-section and a plurality of supporting members traversing and interlinking the wires at least some of which are lifting staves spaced apart around the drum interior characterized in that:

(a) the wires extend circumferentially around the drum, (b) the base of the wedge-shaped cross-section of each wire faces inwardly of the drum, (c) the supporting members are spaced apart around the circumference of the drum by a distance of not less than 75 mm between each pair of adjacent supporting members, (d) the thickness of each said supporting member measured radially of the drum is not less than 15 mm, (e) a solids removal means positioned within the drum to collect solids falling from said lifting staves, and (f) an overhead spray means directed so as to assist the removal of solids from the lifting staves as they pass above the solids removal means so that the solids falling from the lifting staves fall onto said solids removal means.

5. A rotary screen according to claim 4, wherein the said supporting members are mounted longitudinally inside the drum.

6. A rotary screen of the kind for in-line semi-submergible screening comprising a drum which is mounted for rotation about a substantially horizontal axis and is at least partially formed by a plurality of spaced-apart wires of wedge-shaped cross-section and a plurality of supporting members traversing and interlinking the wires at least some of which are lifting staves spaced apart around the drum interior characterized in that:

(a) the wires extend circumferentially around the drum, (b) the base of the wedge-shaped cross-section of each wire faces inwardly of the drum, (c) the supporting members are spaced apart around the circumference of the drum by a distance of not less than 75 mm between each pair of adjacent supporting members, (d) the drum is at least partially supported by a bearing at a point higher than, or horizontally aligned with, the centre point of the drum, (e) a solids removal means positioned within the drum to collect solids falling from said lifting staves, and (f) an overhead spray means directed so as to assist the removal of solids from the lifting staves as they pass above the solids removal means so that the solids falling from the lifting staves fall onto said solids removal means.

7. A rotary screen according to claim 6, wherein the said bearing is a wheel in contact with an inner surface of the drum.

8. A rotary screen according to claim 6, wherein the drum is at least partially supported by an axial bearing mounted externally of the drum at one end of the drum.

9. A rotary screen according to claim 6, wherein the drum is at least partially supported by an axial bearing mounted externally of the drum at one end of the drum, the said axial bearing rotatably supports a member of the drum which is connected to a motor by transmission means for rotation of the drum by the motor, and the said end of the drum is provided with a barrier preventing the flow of liquid through it.

* * * * *